(12) United States Patent
Vavilala et al.

(10) Patent No.: US 8,276,010 B2
(45) Date of Patent: Sep. 25, 2012

(54) NETWORK BASED SYSTEM TO CONTROL AND MONITOR POWER CONSUMPTION OF NETWORKED ELEMENTS

(75) Inventors: Krishna Kumar Vavilala, Cedar Park, TX (US); Sheausong Yang, Saratoga, CA (US); Harish Ramamurthy Devanagondi, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 12/369,960

(22) Filed: Feb. 12, 2009

(65) Prior Publication Data

US 2010/0205471 A1    Aug. 12, 2010

(51) Int. Cl.
G06F 1/26 (2006.01)
G06F 1/32 (2006.01)
G06F 1/00 (2006.01)
G06F 11/30 (2006.01)
G06F 15/16 (2006.01)

(52) U.S. Cl. ......... 713/320; 713/310; 713/340; 709/233
(58) Field of Classification Search .......... 713/300–340; 709/233
See application file for complete search history.

(56) References Cited

U.S. PATENT DOCUMENTS

| | | | | |
|---|---|---|---|---|
| 5,884,086 A * | 3/1999 | Amoni et al. | ................. | 713/300 |
| 6,381,700 B1 * | 4/2002 | Yoshida | ............................ | 726/4 |
| 6,859,882 B2 * | 2/2005 | Fung | ............................... | 713/300 |
| 7,084,752 B2 | 8/2006 | Parello et al. | | |
| 7,257,724 B2 * | 8/2007 | Lehr et al. | ..................... | 713/323 |
| 7,340,597 B1 * | 3/2008 | Cheriton | ........................ | 713/100 |
| 7,392,407 B2 | 6/2008 | Jonnala et al. | | |
| 7,533,281 B2 * | 5/2009 | Hsieh | ............................. | 713/310 |
| 7,756,544 B1 * | 7/2010 | Graham | ........................ | 455/522 |
| 7,774,630 B2 * | 8/2010 | Hatasaki et al. | .............. | 713/320 |
| 2003/0126475 A1 * | 7/2003 | Bodas | ............................ | 713/300 |
| 2004/0078153 A1 * | 4/2004 | Bartone et al. | ................. | 702/57 |
| 2004/0167677 A1 * | 8/2004 | Weiss | ............................. | 700/291 |
| 2004/0255171 A1 * | 12/2004 | Zimmer et al. | ............... | 713/300 |
| 2005/0125703 A1 * | 6/2005 | Lefurgy et al. | ............... | 713/320 |
| 2005/0132237 A1 * | 6/2005 | Barsuk | .......................... | 713/300 |
| 2005/0138439 A1 * | 6/2005 | Rothman et al. | ............. | 713/300 |

(Continued)

FOREIGN PATENT DOCUMENTS

DE          3423830 A1 *  1/1986

(Continued)

OTHER PUBLICATIONS

Bosch i Creus, G.; Niska, P.; , "System-Level Power Management for Mobile Devices," Computer and Information Technology, 2007. CIT 2007. 7th IEEE International Conference on , pp. 799-804, Oct. 16-19, 2007.*

(Continued)

*Primary Examiner* — Faisal M Zaman
(74) *Attorney, Agent, or Firm* — Tucker Ellis LLP (57) ABSTRACT

In an example embodiment, a technique for network based power management for power consuming devices associated with a network. A power control strategy is communicated to network elements coupled to the network. The power control strategy is enforced by the network elements and the network elements report power consumption. Each network element enforces the power strategy relative to the set of power consuming devices operatively associated with the network element. Groups of subtended network elements can manage the power policy in a cluster power management mode or in a collaborative cluster management mode.

29 Claims, 8 Drawing Sheets

U.S. PATENT DOCUMENTS

| | | | |
|---|---|---|---|
| 2005/0273207 A1* | 12/2005 | Dougherty | 700/292 |
| 2005/0283624 A1* | 12/2005 | Kumar et al. | 713/300 |
| 2006/0023384 A1* | 2/2006 | Mukherjee et al. | 361/103 |
| 2006/0053311 A1* | 3/2006 | Chary | 713/300 |
| 2006/0053324 A1* | 3/2006 | Giat et al. | 713/300 |
| 2006/0176808 A1* | 8/2006 | Isobe et al. | 370/229 |
| 2006/0248325 A1* | 11/2006 | Fung | 713/1 |
| 2007/0005995 A1* | 1/2007 | Kardach et al. | 713/300 |
| 2007/0028123 A1* | 2/2007 | Lindley et al. | 713/300 |
| 2007/0143637 A1* | 6/2007 | Tsai | 713/300 |
| 2007/0186121 A1* | 8/2007 | Yasuo | 713/320 |
| 2007/0300085 A1* | 12/2007 | Goodrum et al. | 713/300 |
| 2008/0040562 A1* | 2/2008 | Gower et al. | 711/154 |
| 2008/0052546 A1 | 2/2008 | Schindler et al. | |
| 2008/0126616 A1* | 5/2008 | Kumasawa et al. | 710/42 |
| 2008/0141048 A1* | 6/2008 | Palmer et al. | 713/300 |
| 2008/0215899 A1 | 9/2008 | Jonnala et al. | |
| 2008/0215902 A1 | 9/2008 | Jonnala et al. | |
| 2008/0228932 A1* | 9/2008 | Monette et al. | 709/229 |
| 2009/0052372 A1* | 2/2009 | Durazzo et al. | 370/318 |
| 2009/0083558 A1* | 3/2009 | Sugiki et al. | 713/320 |
| 2009/0086650 A1* | 4/2009 | Moore et al. | 370/253 |
| 2009/0089531 A1* | 4/2009 | Johnson et al. | 711/170 |
| 2009/0119523 A1* | 5/2009 | Totten | 713/322 |
| 2009/0138133 A1* | 5/2009 | Buchholz et al. | 700/295 |
| 2009/0150700 A1* | 6/2009 | Dell'Era | 713/324 |
| 2009/0150703 A1* | 6/2009 | Rave et al. | 713/340 |
| 2009/0187775 A1* | 7/2009 | Ishikawa | 713/310 |
| 2009/0187955 A1* | 7/2009 | Sullivan et al. | 725/106 |
| 2009/0265568 A1* | 10/2009 | Jackson | 713/320 |
| 2009/0271648 A1* | 10/2009 | Ushijima | 713/324 |
| 2009/0323600 A1* | 12/2009 | Chandra et al. | 370/329 |
| 2009/0327774 A1* | 12/2009 | Jeyaseelan et al. | 713/320 |
| 2010/0100716 A1* | 4/2010 | Scott et al. | 713/1 |
| 2010/0235662 A1* | 9/2010 | Nishtala | 713/322 |
| 2010/0274898 A1* | 10/2010 | Zuver et al. | 709/226 |
| 2011/0055605 A1* | 3/2011 | Jackson | 713/320 |

FOREIGN PATENT DOCUMENTS

| | | |
|---|---|---|
| JP | 2009210251 A * | 9/2009 |
| WO | WO 2009150397 A1 * | 12/2009 |
| WO | WO 2010145500 A1 * | 12/2010 |

OTHER PUBLICATIONS

Tianzhou Chen; Xinliang Wu; Jiangwei Huang; , "Operating-System Aided Power-aware Policy for Embedded Peripheral Device," Computational Engineering in Systems Applications, IMACS Multiconference on , pp. 1858-1863, Oct. 2006.*

Pettis, N.; Yung-Hsiang Lu; , "A Homogeneous Architecture for Power Policy Integration in Operating Systems," Computers, IEEE Transactions on , vol. 58, No. 7, pp. 945-955, Jul. 2009.*

Jain, V.; Parr, G.P.; Bustard, D.W.; Morrow, P.J.; , "Deriving a generic energy consumption model for network enabled devices," Communications (NCC), 2010 National Conference on , pp. 1-5, Jan. 29-31, 2010.*

* cited by examiner

| 90 | | | | 108 110 112 |
|---|---|---|---|---|
| | | | DYNAMIC STATE | |
| PORT# | CLASS/TYPE | PM OWNER | VALUE | PRESENCE INDICATOR | PROFILE ACTIVE |
| 1 | IP phone | | | | |
| 2 | AP | | | | |
| 3 | laptop | | | | |
| 92 | 94 | 96 | 102 | 104 | 106 |

| 120 | | | | 138 140 142 |
|---|---|---|---|---|
| | | | DYNAMIC STATE | |
| PORT# | CLASS/TYPE | PM OWNER | VALUE | PRESENCE INDICATOR | PROFILE ACTIVE |
| 4 | legacy IP phone | | | | |
| 5 | legacy AP | | | | |
| 6 | legacy IP phone | | | | |
| 122 | 124 | 126 | 132 | 134 | 136 |

| PORT# | CLASS/TYPE | PM OWNER | VALUE | PRESENCE INDICATOR | PROFILE ACTIVE |
|---|---|---|---|---|---|
| 1 | IP phone | 20 | 5W | present | full |
| 2 | AP | 20 | 15W | present | full |
| 3 | laptop | 20 | 40W | present | full |

FIG. 7a

| PORT# | CLASS/TYPE | PM OWNER | VALUE | PRESENCE INDICATOR | PROFILE ACTIVE |
|---|---|---|---|---|---|
| 4 | legacy phone | switch | 5W | present | phone |
| 5 | legacy AP | switch | 15W | present | AP |
| 6 | legacy laptop | switch | 40W | present | laptop |

NETWORK BASED SYSTEM TO CONTROL AND MONITOR POWER CONSUMPTION OF NETWORKED ELEMENTS

TECHNICAL FIELD

This application is generally related to monitoring and controlling power consumed by devices and other items interconnected by a network.

BACKGROUND

The ability to control power consumption is desirable for many reasons. For example, lowering power consumption can result in cost savings and aid in compliance with 'green' initiatives. However, controlling the power consumption of devices coupled to a network can be problematic because network devices may be receiving power from a variety of sources. For example, some devices may be receiving power from the network (such as Power over Ethernet or "PoE"). Other devices may be receiving power from a wall outlet, such as a 120V AC outlet. Still other devices may be battery powered.

BRIEF DESCRIPTION OF THE DRAWINGS

The accompanying drawings incorporated herein and forming a part of the specification, illustrate examples of the embodiments, and together with the description serve to explain the principles of the embodiments.

OVERVIEW OF EXAMPLE EMBODIMENTS

The following presents a simplified summary of the example embodiments in order to provide a basic understanding of some forms of the example embodiments. This summary is not an extensive overview of the example embodiments. It is intended to neither identify key or critical elements of the embodiments nor delineate the scope of the claims. Its sole purpose is to present some concepts of the example embodiments in a simplified form as a prelude to the more detailed description that is presented later.

In accordance with an example embodiment, there is disclosed herein a method of managing power used by client devices associated with a network. The method comprises selecting a first power control policy at a management station operatively associated with the network, the first power control policy for controlling power consumed by a plurality of power consuming client devices operatively connected with the network; communicating the first power control policy through the network to a first network element operatively associated with the network; based on the first power control policy and device data corresponding to a first set of power consuming client devices operatively coupled with the first network element, determining by the first network element a local power control strategy to effect the first power control policy received from the management station; and, enforcing the local power control strategy by the first network element in accordance with the device data to control power used by each of the first set of power consuming client devices operatively coupled with the first network element.

In accordance with an example embodiment, there is disclosed herein an apparatus for managing power used by client devices associated with a network. The apparatus comprises an interface configured to communicate with at least one power consuming device, and a module in communication with the at least one interface. The module comprises data representative of a power policy specifying a constraint on power consumption. The module is operable to receive power consumption data from the at least one power consuming device via the at least one interface and control an amount of power consumed by the at least one power consuming device.

In accordance with an example embodiment, there is disclosed herein a method for managing power used by client devices associated with a network. The method comprises receiving data representative of a power policy. The power policy comprises a constraint for power consumption. The amount of power consumed by a plurality of power consuming devices is controlled responsive to receiving the data representative of the power policy to comply with the power policy. The plurality of devices are controlled so that total power consumed by the plurality of devices does not exceed the constraint.

In accordance with an example embodiment, there is disclosed herein an apparatus for managing power used by client devices associated with a network. The apparatus comprising a communication interface operable to receive data representative of a power policy specifying a power consumption constraint from an associated network and logic in communication with the communication interface. The logic is responsive to receiving the data representative of the power policy to adjust power consumption to comply with the power policy.

There are shown and described herein example embodiments, simply by way of illustration of at least one of the best modes best suited to carry out the embodiments. As it will be realized, the example embodiments are capable of other different embodiments and their several details are capable of modifications in various obvious ways all without departing from the scope of the claims. Accordingly, the drawings and descriptions herein will be regarded as illustrative in nature and not as restrictive.

DESCRIPTION OF EXAMPLE EMBODIMENTS

This description provides example embodiments not intended to limit the scope of the claims. The figures generally indicate the features of the example embodiments, where it is understood and appreciated that like reference numerals are used to refer to like elements.

Figure 1:
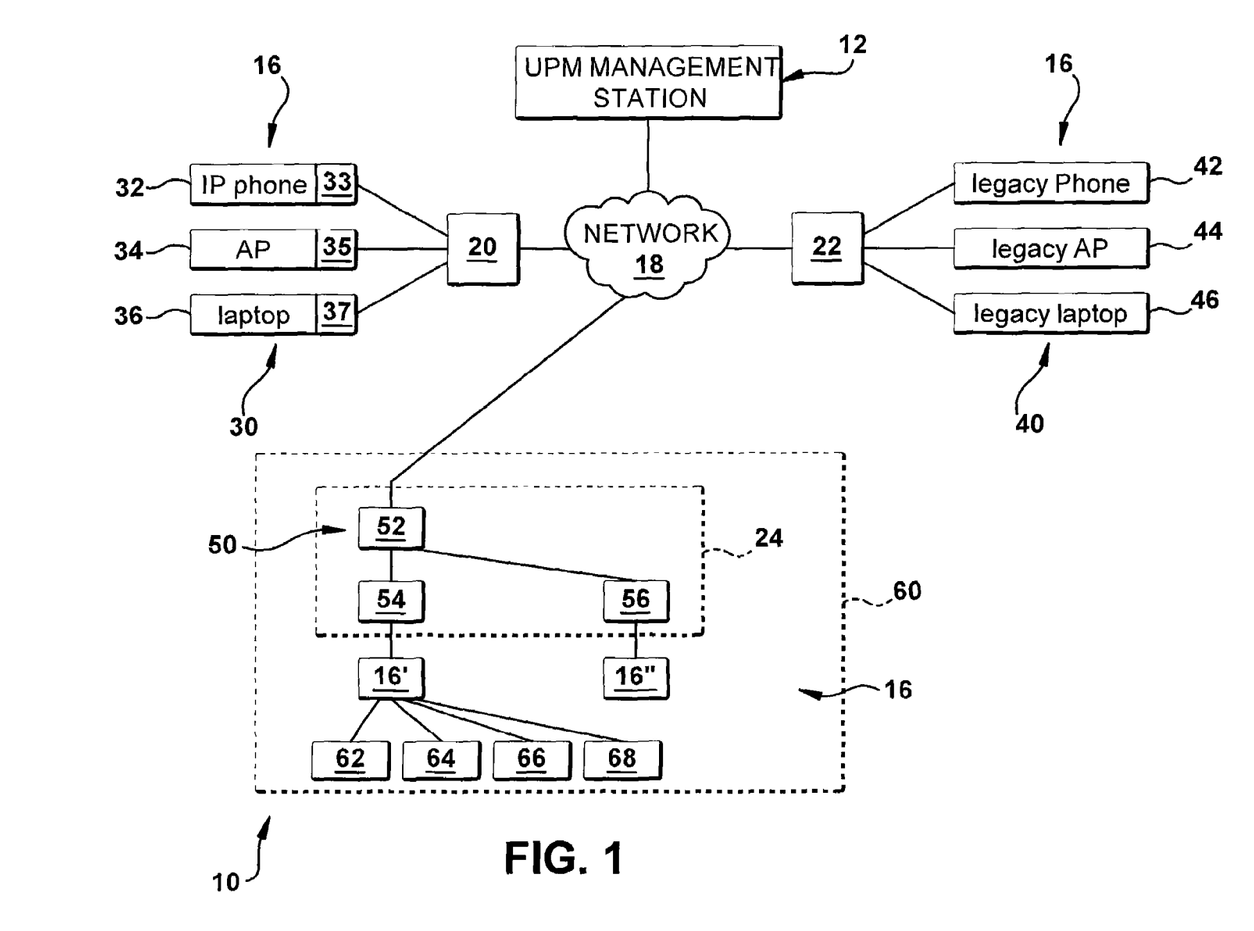
FIG. 1 is a block diagram illustrating a system configured in accordance with an example embodiment.

With reference first to FIG. 1, a system 10 for control and monitoring of networked elements is illustrated in operational schematic form. The system provides a unified power management configuration for a collaborative architectural framework to support many diverse applications together with the power control and monitoring functions such as, for example, utility management applications, physical security controller applications, unified communications applications, and others. In general, the system 10 is comprised of at least one unified power management station 12, a set of network elements 20, 22, 24, and a set of client devices 16. Unified power management station 12, network elements 20, 22, 24, and client devices 16 suitably comprise logic for performing the functionality described herein. "Logic", as used herein, includes but is not limited to hardware, firmware, software embodied in a tangible medium and/or combinations of each to perform a function(s) or an action(s), and/or to cause a function or action from another component upon execution. Logic may comprise of one or more modules embodied in hardware and/or software operable to perform the actions and/or functions described herein. For example, based on a desired application or need, logic and/or module may include a software controlled microprocessor, discrete logic such as an application specific integrated circuit (ASIC), a programmable/programmed logic device, memory device containing instructions, or the like, or combinational logic embodied in hardware. Logic and/or a module may also be fully embodied as software.

As shown, the management station 12 is operatively coupled with the set of network elements 20, 22, 24 by an associated network 18. In one embodiment the associated network is the Internet but the network may be of any form including WANs, LANs, wireless networks, or of any technology or combination of technologies known or hereinafter developed. In an example embodiment, the uniform power management station 12 is operative to enable users of the system 10 to configure power policies and monitor power usage as desired in manners and ways to be described in greater detail below. As used herein, a power policy comprises a constraint or a set of constraints that limit power consumption. For example, power to a particular device may be limited to a predefined value such as 10 watts. In particular embodiments, a power policy may further comprise an action to take if a device does not conform to the constraint. For example, if a device exceeds a constraint actions may include, but are not limited to, removing power from the device and/or controlling access to the network such as denying the device access to the network, controlling the amount of network bandwidth the device is allowed, limiting the speed (e.g. throughput) of the device's link to the network, etc.

The set of network elements 20, 22, 24 are configured to receive unified power management (UPM) policy commands from the management station 12 and to deliver power consumption reports and statuses to the management station 12. The network elements 20, 22, 24 operate in an example embodiment to enforce a power policy received from the management station 12 by propagating the UPM commands from the management station 12 directly to the set of client devices 16. In another example embodiment, network elements 20, 22, 24 enforce a power policy by negotiating with the set of client devices 16 connected therewith for local power modes of operation by the client devices to comply with the power policy. In particular embodiments, the network elements 20, 22, 24 enforce the power policy by controlling access to resources by the set of clients associated with the network element. A limit on bandwidth is an example of controlling access to resources. Other access control options for legacy devices are also available. The set of network elements 20, 22, 24 are also configured to monitor power consumed by the devices at the network elements, accumulate and report data from the devices relating to their power consumption and report the information by propagating the data back to the management station 12 through the network 18. It is to be understood that although the set of network elements 20, 22, 24 are illustrated as being outside the associated network 18, selected ones or all of the elements 20, 22, 24 may be functionally, logically or physically resident within the network 18 as necessary or as desired. The line between the network 18 and the items is for illustration only in describing the example embodiments.

In the example embodiment illustrated, the first network element 20 of the system 10 is in operative communication with a first set of devices 30 including an IP based telephony device 32, a wireless access point (AP) 34 such as for providing a wireless connection to the network element 20 by appropriately configured computers and other mobile devices, and a computer device 36 connected by hard wire to the network element 20. Other types and forms of client devices 30 may be included as well. Each of the client devices 30 respectively includes a client API 33, 35, 37 for interpreting and executing UPM commands from the management station. In that way, the network element 20 connected with the first set of client devices 30 needs only to propagate a set of selected power policy commands from the management station directly to the client application program interface (API). In another mode of operation, the network element 20 negotiates power control modes of operation of the devices 32, 34, 36 based on another set of power control policy commands delivered from the management station 12 in a manner to be described in greater detail below.

Further in the example embodiment illustrated, the second network element 22 of the system 10 is in communication with a second set of devices 40 including a legacy based telephone 42, a legacy access point (AP) 44 such as for providing a wireless connection to the network element 22 by appropriately configured computers and other mobile devices, and a legacy computer device 46 connected by hard wire to the network element 22. Other types and forms of client devices 40 may be included as well. In the example embodiment, none of the client devices 40 associated with the second network element 22 includes a client API for interpreting and executing UPM commands from the management station. As such they are referred to herein as "legacy" client devices. The network element 22 acts as a proxy for the second set of legacy client devices 40 because, as legacy devices, they cannot directly interpret the UPM commands originating from the management station 12. However, as will be described in greater detail below, the second network element 22 is configured to implement the power control policy form the management station by controlling or otherwise regulating access by the legacy devices 40 to system resources such as, for example, access to bandwidth.

The third network element 24 of the example embodiment shown in FIG. 1 is a cluster node 50 including a top network element 52, and first and second subtending network elements 54, 56 disposed at a facility such as, for example, a manufacturing business 60. In an example embodiment, as shown, the network elements 52-56 are arranged in a functional hierarchical manner with the top network element 52 communicating with the management station 12 through network 18 and with the first and second subtending network elements 54, 56 communicating with respective first and second client devices 16', 16". For purposes of assisting in providing an understanding of the claimed embodiments, the first client device 16' in the example embodiment is a facilities controller and the second client device 16" is a computer network at the facility 60. Although only a single computer is shown in the drawing it is to be appreciated that plural computers may be connected. In the illustrated example, first client device 16' is coupled to facility control devices 62 including a door switch 64, an employee badge reader 66, and HVAC controls 68. Those skilled in the art can readily appreciate that this list of facility control devices is abbreviated for ease of describing the example embodiment and that many more devices are typically included.

As will be described herein in greater detail, third network element 24 of the example embodiment is operative in a variety of modes of operation including a cluster power management mode of operation and a collaborative cluster management mode of operation. In the cluster power management mode, the top network element 52 acts as a cluster manager and thereby provides a proxy for the first and second subtending network elements 54, 56 relative to the management station 12. Power management responsibilities are allocated to the first and second subtending network elements 54, 56 by the top network element 52. The cluster power management mode can be beneficial when the first and second subtending network elements 54, 56 are readily adaptable to receive and execute power management commands from the top network element 52. In the collaborative cluster management mode of operation, however, each of the top network element 52 and the first and second subtending network elements 54, 56 are jointly responsible for management of the execution of the UPM power policy commands from the management station 12. The collaborative cluster management mode can be beneficial when each of the top network element 52 and the first and second subtending network elements 54, 56 are equivalently capable of sharing and negotiating responsibility for management of the execution of the UPM power policy.

The illustrated example in FIG. 1 shows a first network element 20 coupled to a first set of devices 30, 32, 34 configured with an API for interpreting an executing UPM commands, a second network element 22 coupled to legacy devices 40, 42, 44, and a third network element 24 coupled to subtending network elements 52, 54, 56 which are coupled to devices 16', 16", 62, 64, 66 and 68. However, the example embodiments disclosed herein should not be construed as limited to such a configuration as those skilled in the art can readily appreciate that a network element, such as any of network elements 20, 22, 24 may be suitably coupled to a combination of devices 30, 32, 34 configured with an API for interpreting and executing a UPM power policy, legacy devices 40, 42, 44, and/or subtending network devices 52, 54, 56. Moreover, any physically realizable number of devices may be coupled to a network element 20, 22, 24.

Figure 2:
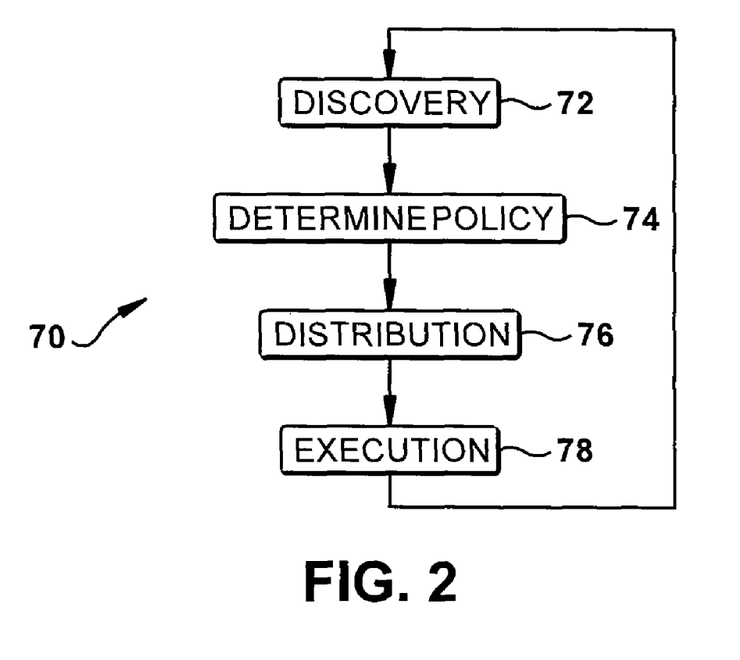
FIG. 2 is a generalized block flow diagram of a method of network based power control and monitoring.

FIG. 2 is a flow chart showing a simplified method 70 of operating a system for control and monitoring of networked elements in accordance with an example embodiment. In general, the method includes a discovery step 72 wherein network elements, such as network elements 20, 22, 24 in FIG. 1, client devices, such as client devices 16 in FIG. 1, and management station, for example management station 12 in FIG. 1, exchange information enabling the system to assemble or otherwise build a database representative of the topology of the system for execution and monitoring of power control policies.

A policy is determined at 74. For example user input may be received at a management station. In another example embodiment data representative of a power policy may be built into the management station, e.g. burned in Read Only Memory (ROM) or other factory configuration. In a example embodiment, the policy may be dependent upon predefined conditions, parameters and/or events. For example, one policy may have different parameters depending upon time of day, day of week or upon external events such as brownout conditions.

At 76, data representative of the policy is distributed to the network elements, such as network elements 20, 22, 24 in FIG. 1 and client devices, such as client devices 16 in FIG. 1, as appropriate. At 78, the power policy is implemented. In an example embodiment, implementation includes enforcing the power policy, reporting power consumption data and/or other information from the client devices and the network elements to the management station. Control returns to 72 wherein changes made to the system 10 such as the addition or removal of network elements 20, 22, 24 or client devices 16 are detected to ensure distribution to the added or remaining elements and devices. The actions described in 72, 74, 76, 78 may be repeated.

Figure 3:
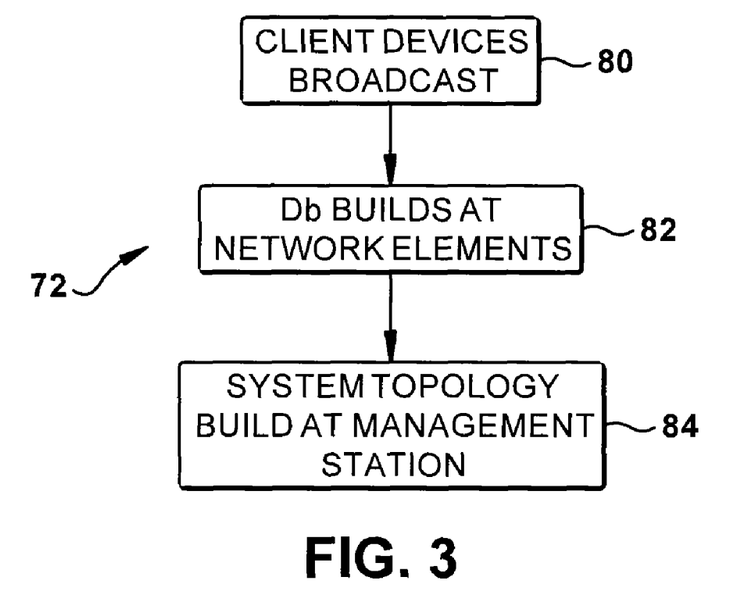
FIG. 3 is a more detailed block flow diagram showing a step in the flow of FIG. 2.

FIG. 3 is an example of actions that may be performed during discovery 72 of method 70 shown in FIG. 2. At 80, client devices (for example client devices 16 in FIG. 1) broadcast information relating to their own inherent capabilities and functionality. The broadcasts are preferably directed to the nearest neighbors of the broadcasting client devices and, in an example embodiment the nearest neighbors contain one or more network elements, such as network elements 20, 22, 24 shown in FIG. 1. However, the broadcasts may reach some or all of the elements or devices within the system 10. At 82, the network elements receive the broadcasts and constructs local power management databases. The database may store data representative of capabilities, functionality, and organizational information in connection with the set of client devices coupled thereto. In particular embodiments, the stored data includes device class/type.

Optionally, at 84, a system topology is determined by the management station. In an example embodiment, the system topology is stored in a database (not shown) at the management station having characteristics and information derived data acquired by the network elements. The topology database may be a relational database or a database having any desired organization or any other form necessary or desired.

Figure 4A:
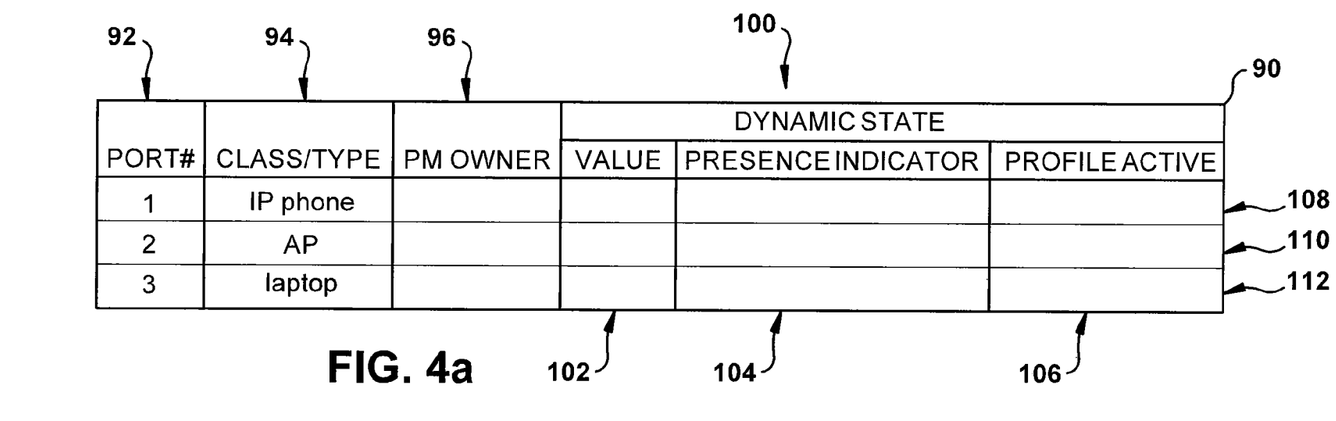
FIGS. 4a and 4b show partially populated databases stored in network elements of FIG. 1.

As an example of a local power management database, FIG. 4a shows a database 90 created by a network element, such as first network element 20 in FIG. 1, in response to receiving the broadcasts from IP based telephone 32, access point (AP) 34, and computer device 36 that may be received during discovery 72 of FIG. 2. Columns in the database include a Port column 92, a Class/Type column 94, a Power Manager (PM) owner column 96, and a set of Dynamic State columns 100 including, for example a value column 102, a presence indicator column 104, and a profile active column 106. As illustrated in FIG. 4a, information received from the IP based phone 32 is stored in the first row 108 of the database 90 and includes information relating to the port assigned to the device and information relating to the class or type of the device. The IP phone is assigned to port "1" and is of a class/type "IP phone." Similarly, information received from the AP 34 is stored in the second row 110 of the database 90 and includes information relating to the port assigned to the device and information relating to the class or type of the device. The AP is assigned to port "2" and is of a class/type "AP." Further, information received from the laptop device 36 is stored in the third row 112 of the database 90 and includes information relating to the port assigned to the device and information relating to the class or type of the device. The laptop is assigned to port "3" and is of a class/type "laptop."

Figure 4B:
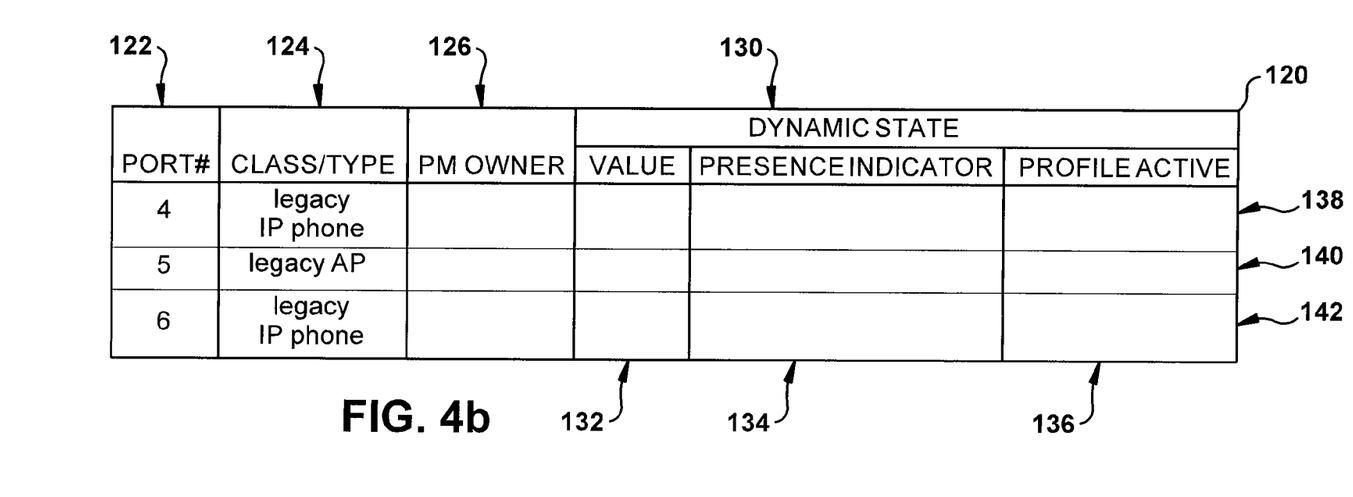

FIG. 4b shows an example of a database 120 created by the second network element 22 (FIG. 1) in response to receiving the broadcasts from the IP based phone 42, the access point (AP) 44, and the computer device 46 during the discovery step 72. Columns in the database 120 at the second network element 40 are preferably the same as described above in connection with the first network element 20 and include a Port column 122, a Class/Type column 124, a PM owner column 126, and a set of Dynamic State columns 130 including, specifically, a value column 132, a presence indicator column 134, and a profile active column 136. As shown, information received from the legacy IP based phone 42 is stored in the first row 138 of the database 120 and includes information relating to the port assigned to the device and information relating to the class or type of the device. The legacy IP phone is assigned to port "4" and is of a class/type "legacy-phone." Similarly, information received from the AP 44 is stored in the second row 140 of the database 120 and includes information relating to the port assigned to the device and information relating to the class or type of the device. The AP is assigned to port "5" and is of a class/type "legacy-AP." Further, information received from the laptop device 46 is stored in the third row 142 of the database 120 and includes information relating to the port assigned to the device and information relating to the class or type of the device. The laptop is assigned to port "6" and is of a class/type "legacy-laptop."

Figure 5:
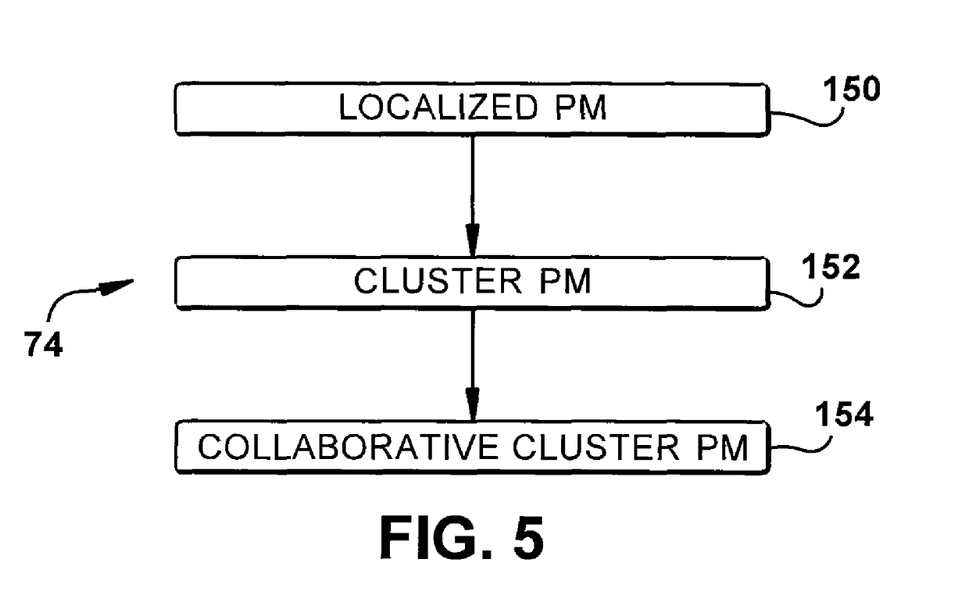
FIG. 5 is a more detailed block flow diagram showing a step in the flow of FIG. 2.

FIG. 5 is an example of actions that may be performed during policy determination 74 of method 70 described above. In an example embodiment, a localized power management mode of operation 150 is selectable by a user to define static power management policies, local power consumption constraints and other parameters of the system. For example a static power management policy, may include specific power control operations to be executed by identified nodes or locations in the system. For example, referring to FIG. 1A a policy may be implemented wherein the IP phone 32 is to be turned off at 5 PM, that port 2 at the first network element 20 for the AP 34 is to operate at 10 Mbps and that port 3 at the first network element 20 for the laptop 36 is to operate at 100 Mbps for example. Also in the localized power management step 150, a set of actions may be defined that are to be executed based on a set of user selectable local constraints. As an example, a user may select that a node in the system 10 (FIG. 1) such as the second network element 22 is limited to a power consumption rate of 10 W. Since the devices 42-46 associated with the second network element 22 are legacy devices, the element 22 is responsive to determine or develop different combinations of bandwidth reduction and power modes of client drives for the new arbitrated policy.

With continued reference to FIG. 5, a system a cluster power management mode 152 may be selected wherein one or more selected devices may operate as proxies for one or more other selected devices and, further, power policies are propagated by and through elements within the system 10. A user may define a cluster as being, for example, the elements within the third network element 24 and, further may select the top network element 52 as the cluster manager wherein the top network element 52 is operative to propagate power policies to the first and second subtending network elements 54, 56. In the cluster power management mode, the first and second subtending network elements 54, 56 are separately responsible for executing the power policies propagated thereto through the top network element 52 and sourced from the management station 12.

At 154, a collaborative cluster power management mode of operation may be selected. As an example, a user may propagate a power policy to the third network element 24 (FIG. 1) wherein each of the top network element 52 and the first and second subtending network elements 54, 56 collaboratively share in responsibility of executing the power policy. In the collaborative cluster power management mode of operation, preferably, none of the network elements 52-56 operate as a manager of the other elements nor does any of the elements act as a proxy for any of the other elements. Power policy enforcement and execution is shared equally in the collaborative power management mode 154.

Figure 6:
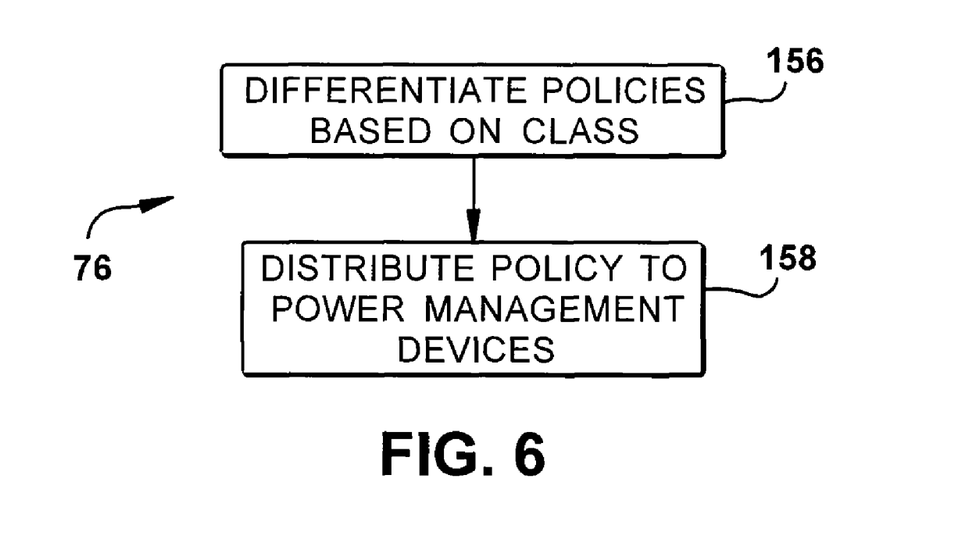
FIG. 6 is a more detailed block flow diagram showing a step in the flow of FIG. 2.

FIG. 6 is an example of actions that may be performed during distribution 76 of method 70 described above. With reference now to FIG. with continued reference to FIG. 6, the distribution of the power policy to network elements 20, 22, 24 of the system may include a differentiation of the policies based on the class of the elements at step 156 and a broadcasting or "pushing out" of the power policies at step 158 by the management station 12 to the network elements 20, 22, 24 through the associated network 18. Differentiating the policies can be selectively performed as desired or necessary to tune global power management to specific local strategies based on local capabilities and functionality. As a first example, a differentiated local power management strategy can be based on router or switch capability and, as another example a strategy can be based on the physical location of the network element 20, 22, 24 or the client device 30, 40, 50 in the overall system 10.

The global policy determined at the management station 12 is distributed at step 158 to the various nodes and connections within the system. As an example, the management station communicates the differentiated power management policies to each of the network elements 20, 22, 24 in the system 10. In turn, the elements receive the policies and store the policies in their respective databases 90, 120 for future execution 78.

Figure 7A:
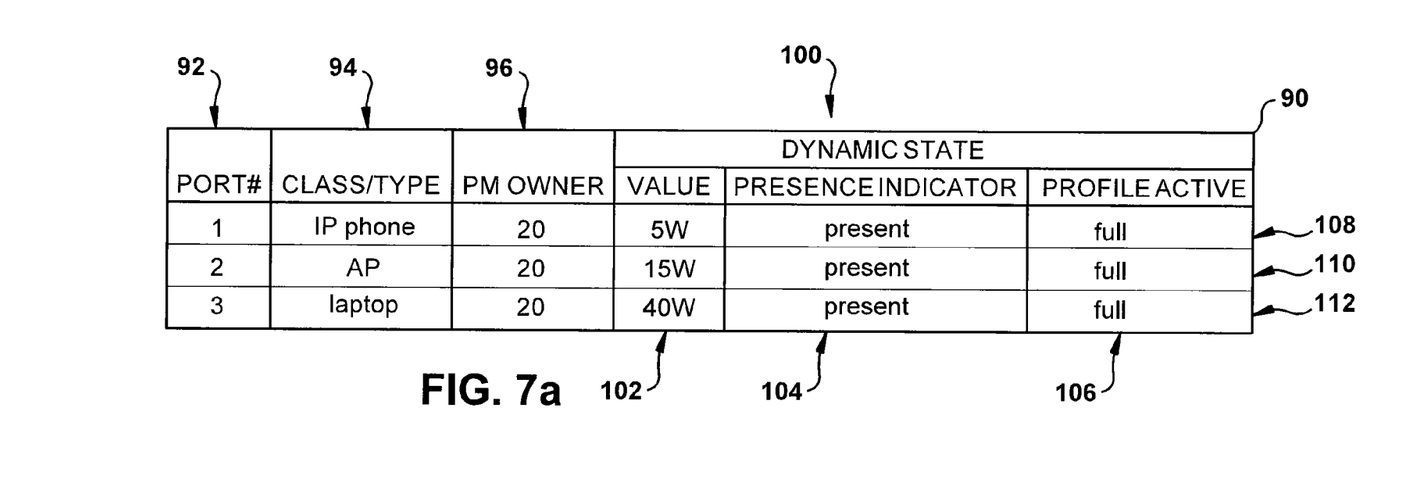
FIGS. 7a and 7b show populated databases stored in network elements of FIG. 1

In the above regard, an example of database 90 maintained by first network element 20 containing the information developed during the discovery 72 as well as the information received during the distribution 76 is shown in FIG. 7a. The Port column 92 and the Class/Type column 94 contain the information discussed above developed in the discovery operation. However, the PM owner column 96 and the set of Dynamic State columns 100 including, specifically, the value column 102, the presence indicator column 104, and the profile active column 106 are completed by the network element 20 during the distribution step 76 in response to instructions received from the management station 12 through the network 18. As shown in the illustrated example, the differentiated power policy for the IP based phone 32 is stored in the first row 108 of the database 90 and includes information relating to the owner or manager and a dynamic state. The IP phone 32 is assigned to PM owner "20", has a dynamic state value of "5 W", a dynamic state presence indicator of "present", and a dynamic state profile active of "full". Similarly, information in the second row 110 of the database 90 includes information relating to owner or manager and a dynamic state of the AP 34. The AP 34 is assigned to PM owner "20", has a dynamic state value of "15 W", a dynamic state presence indicator of "present", and a dynamic state profile active of "full". Lastly, information in the third row 112 of the database 90 includes information relating to owner or manager and a dynamic state of the laptop 36. The laptop 36 is assigned to PM owner "20", has a dynamic state value of "40 W", a dynamic state presence indicator of "present", and a dynamic state profile active of "full".

Figure 7B:
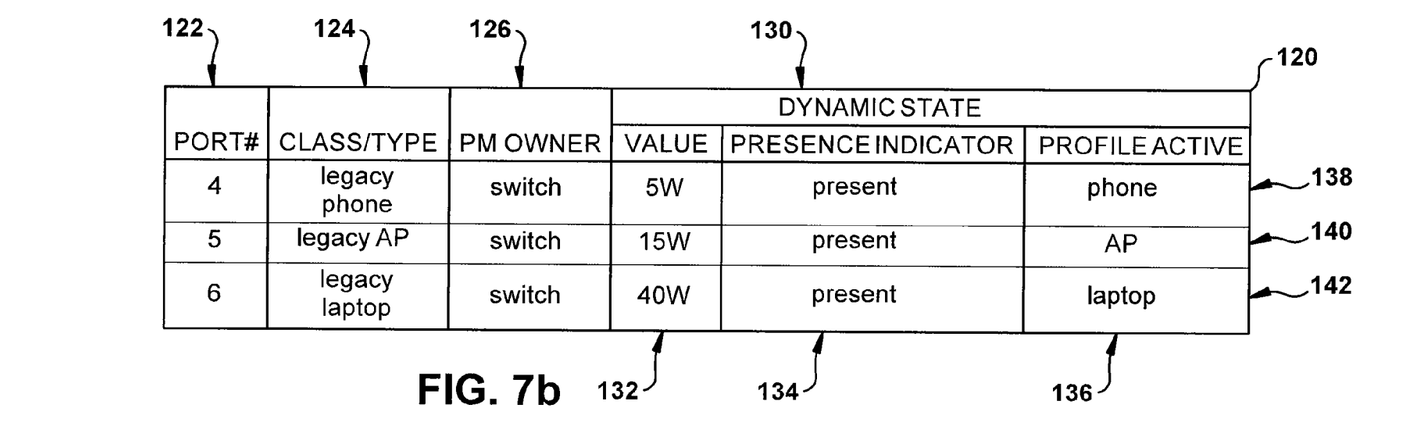

An example of database 120 maintained by second network element 22 containing the information developed during the discovery 72 as well as information received during distribution 76 is shown in FIG. 7b. The Port column 122 and the Class/Type column 124 contain the information discussed above developed in the discovery operation. However, the PM owner column 126 and the set of Dynamic State columns 130 including, specifically, the value column 132, the presence indicator column 134, and the profile active column 136 are completed by the network element 22 during the distribution step 76 in response to instructions received from the management station 12 through the network 18. As shown in the illustrated example, the differentiated power policy for the legacy IP based phone 42 is stored in the first row 138 of the database 120 and includes information relating to the owner or manager and a dynamic state. The legacy IP phone 42 is assigned to PM owner "switch" indicating that it is not powered directly by the network, has a dynamic state value of "5 W", a dynamic state presence indicator of "present", and a dynamic state profile active of "phone". Similarly, information in the second row 140 of the database 120 includes information relating to owner or manager and a dynamic state of the legacy AP 44. The legacy AP 44 is assigned to PM owner "switch" indicating that it is not powered directly by the network, has a dynamic state value of "15 W", a dynamic state presence indicator of "present", and a dynamic state profile active of "AP". The information in the third row 142 of the database 120 includes information relating to owner or manager and a dynamic state of the legacy laptop 46. The legacy laptop 46 is assigned to PM owner "switch" indicating that it is not powered directly by the network, has a dynamic state value of "40 W", a dynamic state presence indicator of "present", and a dynamic state profile active of "laptop".

Figure 8:
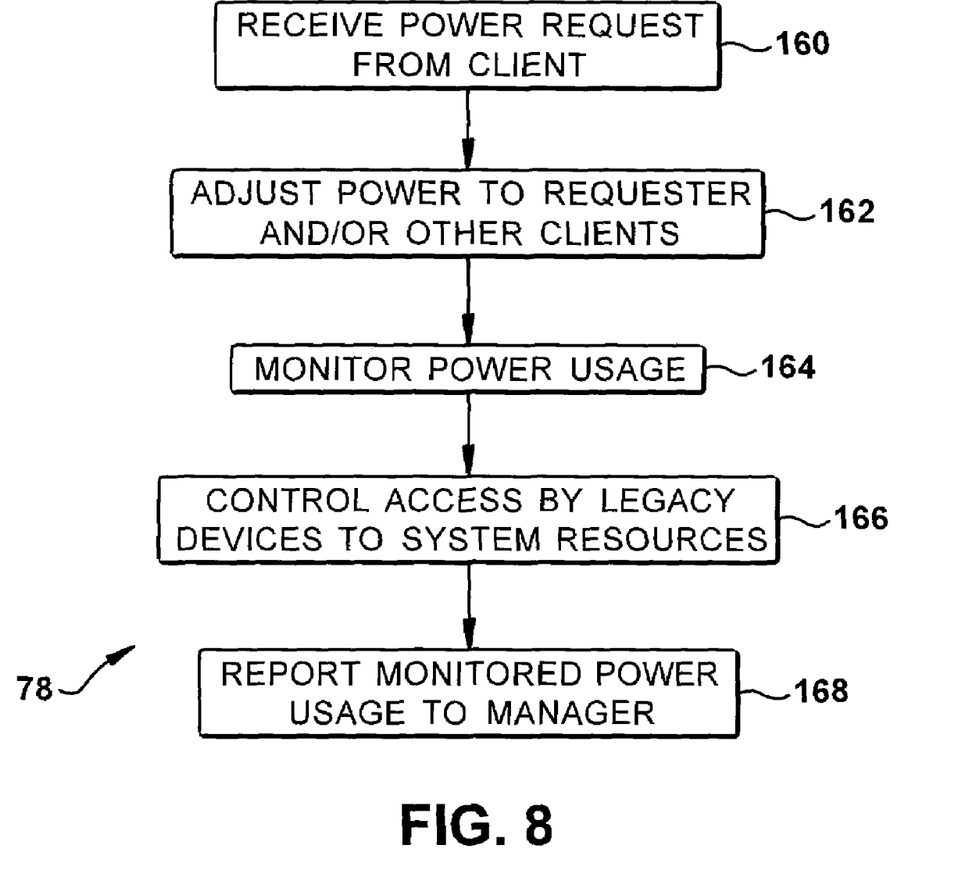
FIG. 8 is a more detailed block flow diagram showing a step in the flow of FIG. 2.

FIG. 8 is an example of actions that may be performed during execution 78 of method 70 (FIG. 2) in accordance with the example embodiment. As shown there for illustration purposes, execution 78 comprises receiving a power request from a client as illustrated at 160. For example, requests may be received by network elements 20, 22, 24 (FIG. 1). The requests may include a request for clearance for a level of power consumption from a client device 16, for example 10 W. Power management decisions are made at 162. In an example embodiment, such as is illustrated in FIG. 1, power management decisions are made at each network element 20, 22, 24 individually and in accordance with the power policy distributed by a management station. Each network element is also responsible for honoring the requests received from the client devices in terms of at least responding to the requests. In some situations, the requests must be denied in order to remain faithful to the network element's share of the responsibility of the global power policy form the management station. Still further, each network element is responsible to perform power monitoring and reporting 164 of power consumption to the management station.

Some network elements may be associated with legacy network clients such as for example the second network element 22 in FIG. 1 is associated with a legacy phone 42, a legacy AP 44, and a legacy laptop 46. Control of power consumed by legacy clients is executed at 166 by various means and in various forms. In one example, access to network resources such as bandwidth by the legacy client is controlled by the network element to effectively perform an indirect control. In another form, power consumption limits for other client devices is renegotiated by the network element to accommodate the uncontrollable demands at the node by a legacy device. In step 168, each network element associated with one or more legacy client device reports power usage data and statistics to the management station 12.

Figure 9:
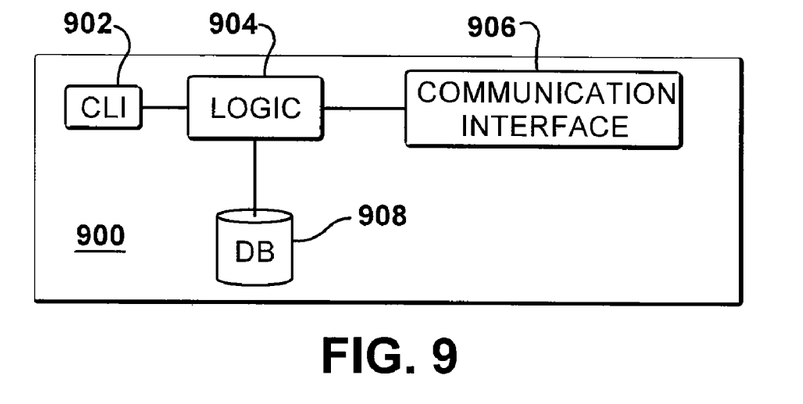
FIG. 9 is a block diagram of a power management station in accordance with an example embodiment.

FIG. 9 is a block diagram of a power management station 900 in accordance with an example embodiment. The configuration of power management station 900 is suitable to implement power management station 12 described in FIG. 1 herein. Power management station 900 may be implemented as a standalone device, or can be implemented within another device. For example power management station 900 may be implemented in a server that is accessible by a data terminal, or power management station 900 may be implemented as part of a personal computer or other processor based device.

Power management station is configured to receive data representative of a power policy. For example, power management station may suitably comprise a user interface, such as a command line interface (CLI) 902 that would enable a user to input to the data. User interface 902 may suitably comprise a keypad, mouse, touch screen, audio input or any suitable means of receiving commands from a network administrator.

Logic 904 is coupled to user interface 904 and is operable to receive the data representative of a power policy from user interface 904. Logic 904 is responsive to receiving the data to distribute the data to infrastructure nodes on an associated network via communication interface 906. In an example embodiment, logic 904 stores the data representative of a power policy (or a copy of the data) in database (DB) 908.

In particular embodiments, logic 904 is operable to receive power consumption data from infrastructure nodes on the associated network via communication interface 906. Logic 904 may store the consumption data in database 908. Logic 904 may also provide the data via user interface 902. For example the data may be displayed on a visual display device (not shown) or printed by a printer or multifunction peripheral (not shown) coupled to logic 904.

In an example embodiment, user interface 902 and logic 904 are co-located within the same device, for example in a microprocessor based system. In another example embodiment, user interface 902 is located remotely from logic 904, for example interface may be provided by a terminal at a remote location that is in data communication with logic 904.

Figure 10:
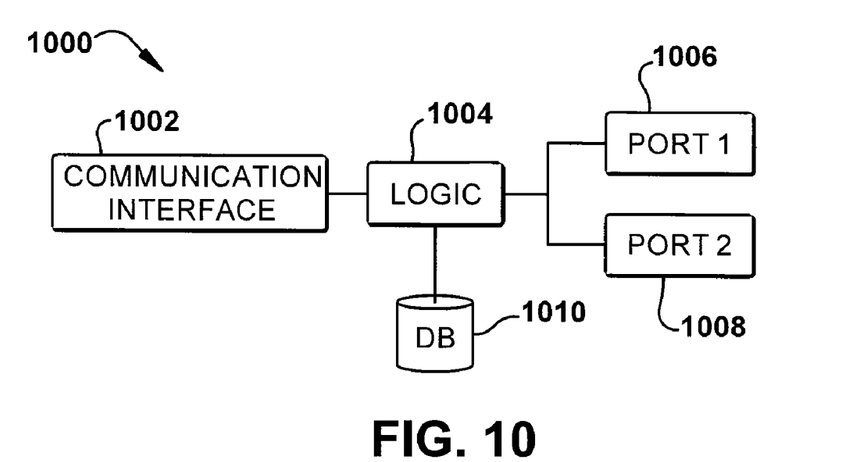
FIG. 10 is a block diagram of a network element in accordance with an example embodiment.

FIG. 10 is a block diagram of a network element 1000 in accordance with an example embodiment. Network element 1000 is suitable for implementing any one of network elements 20, 22, 24 illustrated in FIG. 1 or subtending network elements 52, 54, 56 also illustrated in FIG. 1. Network element 1000 may be implemented as a standalone device or can be employed in another infrastructure device such as a router and/or switch.

Network element 1000 comprises an interface 1002 which is configured to communicate with another device on a network, such as a network power manager described herein, and can receive data representative of a power control policy. Logic 1004 is coupled to communication interface 1002 and can receive the data representative of a power policy via communication interface 1002. In an example embodiment, the power policy specifies a constraint on power consumption. Upon receipt of the data representative of a power policy, logic 1004 is operable to implement the policy, for example as described in various example embodiments herein. In particular embodiments, logic 1004 is operable to save the data (or a copy of the data) representative of a power policy, such as in database 1010. In the illustrated example there are two ports (Port 1) 1006 and (Port 2) 1008 operable to communicate with power consuming devices; however, the example embodiments described herein should not be construed as so limited as those skilled in the art should readily appreciate that network element 1000 may suitably comprise any physically realizable number of ports and in at least one example embodiment a single port. Ports 1006, 1008 may be embodied within communication interface 1002 or may be embodied in an additional interface (not shown). For example, communication interface 1002 can receive power policy data from a power management station coupled to a first network which is implemented by a second interface employing ports 1006, 1008 coupled to power consuming devices on a second network, or ports 1006, 1008 may be embodied in communication interface 1002 in which case the power management station and power consuming devices are coupled to the same network.

In an example embodiment, logic 1004 is also operable to receive power consumption data from at least one power consuming device via one of ports 1006, 1008. Logic 1004 is operable to communicate with the power consuming device and to control an amount of power consumed by power consuming device to comply with the power policy.

In an example embodiment, logic 1004 is operable to allow devices coupled to port 1006 to consume power up to a first power level and to allow devices coupled to port 1008 to consume power up on a second power level to comply with the power policy. In particular embodiments, ports 1004, 1006 comprise a plurality (set) of ports. Thus, a first set of ports can be configured to allow devices coupled to the first set of ports to consume a first amount of power while devices coupled to the second set of ports are allowed to consume a second amount of power. Logic 1004 may change the amount of power allowed based on power consumption data received via ports 1006, 1008. For example, if a power policy limits power consumption to 10 W and devices coupled to port 1006 are only consuming 4 W (even though they are allowed up to 6 W), logic 1004 can allow devices coupled to port 1008 to consume up to 6 W. If the devices on port 1006 consume their allotted 6 W, then logic 1004 can change the amount of power allowed to devices coupled to port 1008 to 4 W.

In an example embodiment, power consumption may be limited by device type. As noted in FIGS. 4*a* & 4*b*, logic 1004 may suitably comprise data device type data, thus ports coupled to one type of device may be allowed to consume power at one level while ports coupled to a second type of device may be allowed to consume power at a second (higher/lower) level.

In an example embodiment, at least one power consuming device coupled to either port 1006,1008 is receiving power from apparatus 1000. For example, the device may be receiving power via Power over Ethernet (PoE). Logic 1004 can limit power consumed by the power consuming device by limiting an amount of power provided to the power consuming device. Logic 1004 may also stop power from being provided to the device.

In an example embodiment, logic 1004 may enforce the power policy by limiting a power consuming device's access to the network. For example if a device is exceeding its constraint, logic 1004 may limit the amount of bandwidth available for the device and/or deny access to the network.

In an example embodiment, the power policy comprises a first constraint to be applied responsive to a first condition and a second constraint to be applied to a second condition. For example, a first power policy may specified for business hours, e.g. Monday-Friday from 8:00 am to 5:00 pm, and a second power policy may be specified for after hours, e.g. Monday-Friday from Midnight-8:00 am and/or 5:00 pm to midnight as well as weekends. Different policies may also be specified for different environmental conditions, e.g. during blackouts and/or brown outs. In particular embodiments, logic 1004 may receive data from a network power management station via communication interface 1002 instructing network element 1000 to implement a specific policy. Logic 1004 is operative to implement the appropriate policy.

In an example embodiment, logic 1004 is responsive to receiving the power policy to transmit the power policy via one of ports 1006, 1008 to a power consuming device. The policy may be sent using any appropriate protocol such as Simple Network Management Protocol (SNMP). Logic 1004 is operable to determine whether a power consuming device connected to one of ports 1006, 1008 is capable of receiving power policy data. Upon determining a device is capable of receiving power policy data, Logic 1004 can send policy data for the device via one of ports 1006, 1008. Moreover, logic 1004 can send policy updates when appropriate.

In an example embodiment, logic 1004 is operable to receive data representative of power consumption for a power consuming device via one of ports 1006, 1008. In an example embodiment, logic 1004 stores the data in database 1010. In particular embodiments, logic 1004 is operable to send the consumption data (or a copy of the data) to a power management station via communication interface 1002.

In an example embodiment, one, or both, of ports 1006, 1008 is coupled to at least one network element, such as a subtending network elements 54, 56 described herein in FIG. 1. Logic 1004 is configured to communicate with the network element via one of ports 1006, 1008. Logic 1004 may be configured to operate with the at least one network element in a cluster power management mode or in a collaborative cluster management mode.

In the cluster power management mode, logic 1004 acts as a cluster manager and thereby provides a proxy for the at least one subtending network element relative to a management station in communication with logic 1004 via communication interface 1002. Power management responsibilities are communicated and allocated to the subtending network elements by logic 1004. The cluster power management mode can be beneficial when subtending network elements are readily adaptable to receive and execute power management commands from logic 1004.

In the collaborative cluster management mode of operation, however, logic 1004 and logic within the at least one network element (or subtending network element) are jointly responsible for management of the execution of power policy commands. The collaborative cluster management mode can be beneficial when logic 1004 and the subtending network element are capable of sharing and negotiating responsibility for management of the execution of the power policy.

Figure 11:
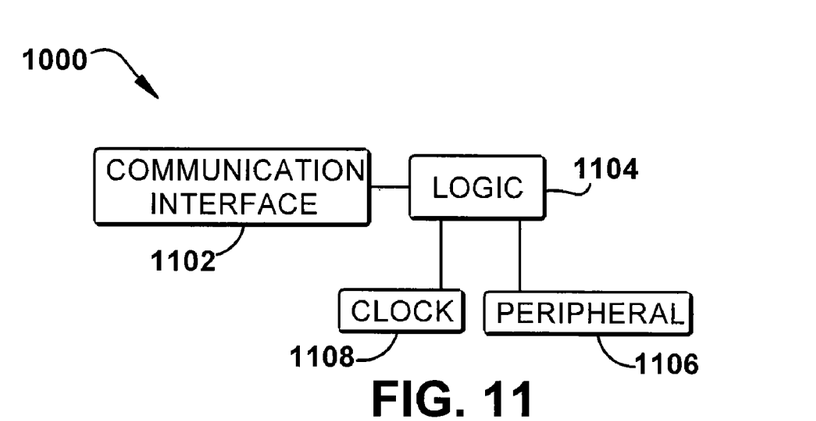
FIG. 11 is a block diagram of a client device in accordance with an example embodiment.

FIG. 11 is a block diagram of a client device 1100 in accordance with an example embodiment. Client device 1100 is suitable for implementing any of IP phone 32 (FIG. 1), AP 34 (FIG. 1), Laptop 36 (FIG. 1), legacy devices 42, 44, 46 (FIG. 1) and/or devise 62, 64, 66, 68 and/or client devices 16', 16".

Client device 1100 comprises a communication interface 1102 operable to receive data representative of a power policy specifying a power consumption constraint from an associated network. For example the data may be received from network element 1000 described in FIG. 10 or from a router or switch that includes the equivalent functionality of network element 1000. Logic 1104 is in communication with the communication interface 1102 and is configured to receive the power policy data via communication interface 1102. Logic 1104 is responsive to receiving the data representative of the power policy to adjust power consumption of client device 1100 to comply with the power policy.

In an example embodiment, logic 1104 may selectively change the power provided to one or more peripherals, e.g. peripheral 1106. For example a lower amount of power may be provided to peripheral 1106 or no power may be provided to comply with the power policy. In particular embodiments, peripheral 1106 may be any device capable of communicating with a computing device such as a display device, communication device, printing device, multifunction peripheral, etc. In the case where multiple peripherals are coupled to client device 1100, logic 1104 may selectively change the power to any one or more of the peripherals.

In an example embodiment, a clock circuit 1108 having a clock frequency is coupled to logic 1104. Logic 1104 may change the clock frequency in order to comply with the power policy. For example, logic 1104 may be operable to lower the frequency to save power.

In an example embodiment, logic 1104 is operable to send data representative of power consumption by client device 1100 via communication interface 1102. For example, logic 1104 may send power consumption data to an associate network element.

Figure 12:
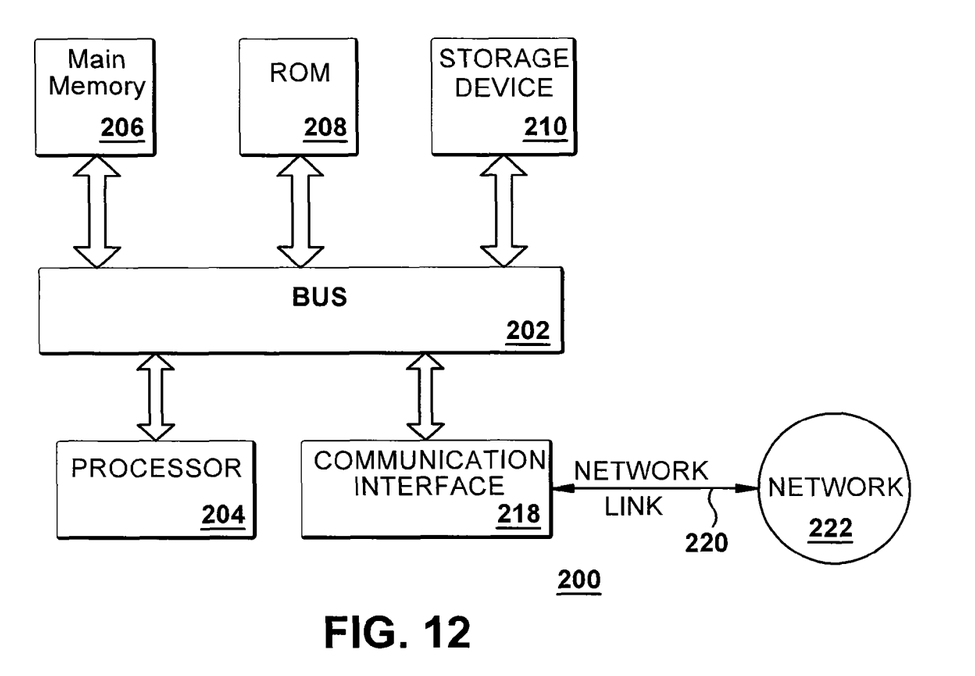
FIG. 12 is a block diagram of a computer system for implementing an example embodiment.

FIG. 12 is a block diagram of a computer system 200 for implementing an example embodiment. For example, computer system 200 is suitably adapted for implementing the functionality of power control and monitoring system 10 (FIG. 1), network elements 20, 22, 24 (FIG. 1), any of devices 32, 34, 36, 42, 44, 46 (FIG. 1), subtending elements 52, 54, 56 (FIG. 1), logic 904 (FIG. 9), logic 1004 (FIG. 10), and/or logic 1104 (FIG. 11). Computer system 200 includes a bus 202 or other communication mechanism for communicating information and a processor 204 coupled with bus 202 for processing information. Computer system 200 also includes a main memory 206, such as random access memory (RAM) or other dynamic storage device coupled to bus 202 for storing information and instructions to be executed by processor 204. Main memory 206 also may be used for storing a temporary variable or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

A feature of the embodiment is related to the use of computer system 200 for network based power control, management, and reporting. According to one embodiment, power control and management provided by computer system 200 in response to processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the embodiment. Thus, embodiments are not limited to any specific combination of hardware circuitry and software.

The term "computer-readable medium" as used herein refers to any medium that participates in providing instructions to processor 204 for execution. Such a medium may take many forms, including but not limited to non-volatile media and volatile media. Non-volatile media include for example optical or magnetic disks, such as storage device 210. Volatile media include dynamic memory such as main memory 206. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 200 also includes a communication interface 218 coupled to bus 202. Communication interface 218 provides a two-way data communication coupling to a network link 220 that is connected to a network 222. For example, communication interface 218 may be a local area network (LAN) card to provide a data communication connection to a compatible LAN. Wireless links may also be implemented. In any such implementation, communication interface 218 sends and receives electrical, electromagnetic, or optical signals that carry digital data streams representing various types of information.

Network link 220 typically provides data communication through one or more networks to other data devices, such as IP phones, APs, computers, and other client devices. For example, network link 220 may provide a connection through network 222 to the Internet. Networks 222 and the Internet 228 may use electrical, electromagnetic, or optical signals that carry the digital data to and from computer system 200, which are exemplary forms of carrier waves transporting the information.

Computer system 200 can send messages and receive data, including program codes, through the network(s), network link 220, and communication interface 218. In the Internet example, a server (not shown) might transmit a requested code for an application program through the Internet to network 222, and communication interface 218. The received code may be executed by processor 204 as it is received, and/or stored in storage device 210, or other non-volatile storage for later execution.

What has been described above includes example implementations. It is, of course, not possible to describe every conceivable combination of components or methodologies for purposes of describing the various embodiments, but one of ordinary skill in the art will recognize that many further combinations and permutations are possible. Accordingly, the scope of the appended claims interpreted in accordance with the breadth to which they are fairly, legally, and equitably entitled include all such equivalents, alterations, modifications, and variations.

The invention claimed is:

1. An apparatus, comprising:
   an interface configured to communicate with at least one associated power consuming device; and
   a module in communication with the at least one interface, the module comprising data representative of a power policy, the power policy specifying a constraint on power consumption;
   wherein the module is operable to receive power consumption data from the at least one associated power consuming device via the at least one interface and control an amount of power consumed by the at least one power consuming device;
   wherein the module is further operable to limit an amount of bandwidth to the at least one associated power consuming device responsive to the power consuming device not conforming to the constraint on power consumption;
   wherein the module is a cluster node of network elements arranged in a functional hierarchical manner comprising a top network element communicating with an associated management station to receive the power policy from the associated management station, and first and second subtending network elements communicating respectively with first and second associated power consuming client devices; and, wherein the cluster node is operable to operate in a collaborative cluster power management mode where power management policies are communicated by the top network element to the first and second subtending network elements wherein the top network element and the first and second subtending network elements are configured to negotiate and collaboratively share responsibility for executing the power management policies relative to the respective first and second associated power consuming client devices.

2. The apparatus set forth in claim 1, wherein the interface further comprises a plurality of interfaces comprising a first set of interfaces and a second set of interfaces;

wherein the module is operable to allow devices coupled to the first set of interfaces to consume power up to a first power level and to allow devices coupled to the second set of interfaces to consume power up on a second power level to comply with the power policy.

3. The apparatus set forth in claim 1, wherein a one of the at least one interface is providing power to a power consuming device coupled to the one of the at least one interface;

wherein the module is further operable to limit power consumed by the power consuming device by limiting an amount of power provided to the power consuming device.

4. The apparatus set forth in claim 1, wherein the module is further operable to limit the at least one power consuming device's access to an associated network responsive to determining the at least one power consuming device is exceeding the constraint.

5. The apparatus set forth in claim 4, wherein the module is further operable to limit the at least one power consuming device's access to the associated network by limiting an amount of bandwidth the at least one power consuming device may use to access the associated network.

6. The apparatus set forth in claim 4, wherein the module is further operable to limit the at least one power consuming device's access to the associated network by denying access to the associated network responsive to the at least one power consuming device not complying with a constraint on power consumption.

7. The apparatus set forth in claim 1, wherein the data representative of a power policy comprises a first constraint to be applied responsive to a first condition and a second constraint to be applied to a second condition.

8. The apparatus set forth in claim 7, wherein the first condition is a first time period and the second condition is a second time period.

9. The apparatus set forth in claim 1, wherein the module is responsive to receiving the power policy to transmit the power policy via the at least one interface to the at least one power consuming device.

10. The apparatus set forth in claim 1, wherein the module is further configured to receive data representative of power consumption from the at least one power consuming device via the at least one interface;

wherein the module is configured to communicate with a power management station over a network via the interface; and wherein the module is responsive to forward the data representative of power consumption to the power management station.

11. The apparatus set forth in claim 1, wherein the module is configured to communicate with at least one subtending network element via a one of the at least one interface; and wherein the module is operable to operate in a collaborative cluster management mode.

12. A method comprising:

obtaining, from an associated network, data representative of a power policy; and controlling an amount of power consumed by a plurality of associated power consuming devices responsive to receiving the data representative of a power policy to comply with the power policy;

wherein the power policy comprises a constraint for power consumption and the plurality of associated devices are controlled so that total power consumed by the plurality of associated devices does not exceed the constraint;

wherein the controlling the amount of power consumed by the plurality of associated power consuming devices comprises controlling by a cluster node of network elements arranged in a functional hierarchical manner comprising a top network element communicating with the associated network to receive the power policy from the associated network, and first and second subtending network elements communicating respectively with first and second associated power consuming client devices, wherein the cluster node is operable to operate in a collaborative cluster power management mode where enforcement and execution responsibilities of the power policy are negotiated between the top network element and the first and second subtending network elements as a negotiated power policy, and wherein the top network element and the first and second subtending network elements are jointly responsible for executing the negotiated power policy relative to the respective first and second associated power consuming client devices.

13. The method set forth in claim 12, further comprising transmitting device power data to the plurality of power consuming devices, the device power data comprising data representative of a maximum power consumption allowed for each of the plurality of power consuming devices.

14. The method set forth in claim 12, controlling the amount of power consumed by the plurality of devices further comprising:

setting a first power consumption limit to a first set of devices coupled to a first set of ports; and setting a second power consumption limit to a second set of devices coupled to a second set of ports.

15. The method set forth in claim 14, controlling the amount of power consumed by the plurality of devices further comprising transmitting the first power consumption limit to the first set of devices.

16. An apparatus, comprising:

a communication interface operable to receive data representative of a power policy specifying a power consumption constraint from an associated network; and logic in communication with the communication interface;

wherein the logic is responsive to receiving the data representative of the power policy to adjust power consumption to comply with the power policy;

wherein the logic comprises a cluster node of network elements arranged in a functional hierarchical manner comprising a top network element communicating with the associated network to receive the power policy from the associated network, and first and second subtending network elements communicating respectively with first and second associated power consuming client devices; and, wherein the cluster node is operable to operate in a collaborative cluster power management mode where enforcement and execution responsibilities of the power policy are negotiated between the top network element and the first and second subtending network elements as a negotiated power policy, and wherein the top network element and the first and second subtending network elements are jointly responsible for executing the negotiated power policy relative to the respective first and second associated power consuming client devices.

17. The apparatus set forth in claim 16, further comprising:
a peripheral in communication with the logic;
wherein the logic is operable to remove power from the peripheral to comply with the power policy.

18. The apparatus set forth in claim 16, further comprising:
a clock circuit having a clock frequency in communication with the logic wherein the logic is operable to change the clock frequency to comply with the power policy.

19. The apparatus set forth in claim 16, wherein the logic is further configured to provide data representative of an amount of power consumed via the communication interface to a device coupled to the associated network.

20. Software encoded in at least one non-transitory computer-readable media and when executed operable to:
receiving, from an associated management station, data representative of power consumption from a plurality of associated power consuming devices; and
controlling an amount of power consumed by a plurality of associated power consuming devices to comply with a power policy;
wherein the power policy comprises a constraint for power consumption and the plurality of associated devices are controlled so that total power consumed by the plurality of associated devices does not exceed the constraint; and
wherein controlling the amount of power consumed further comprises controlling the amount of power consumed by a cluster node of network elements arranged in a functional hierarchical manner comprising a top network element communicating with the associated management station to receive the power policy from the associated management station, and first and second subtending network elements communicating respectively with first and second associated power consuming client devices, and communicating by the cluster node operating in a collaborative cluster power management mode power management policies by the top network element to the first and second subtending network elements wherein the top network element and the first and second subtending network elements are configured to negotiate and collaboratively share responsibility for executing the power management policies relative to the respective first and second associated power consuming client devices.

21. The software set forth in claim 20, further operable to:
setting a first power consumption limit to a first set of devices; and
setting a second power consumption limit to a second set of devices.

22. The software set forth in claim 20, further operable to limit power consumed by the at least one power consuming device by limiting an amount of power provided to the at least one power consuming device.

23. The software set forth in claim 20, further operable to limit the at least one power consuming device's access to an associated network responsive to determining the at least one power consuming device is exceeding the constraint.

24. The software set forth in claim 23, further operable to limit the at least one power consuming device's access to the associated network by limiting an amount of bandwidth the at least one power consuming device may use to access the associated network.

25. An apparatus, comprising:
means for receiving data representative of power consumption from a plurality of associated power consuming devices; and
means for controlling an amount of power consumed by a plurality of associated power consuming devices to comply with a power policy;
wherein the power policy comprises a constraint for power consumption and the plurality of associated devices are controlled so that total power consumed by the plurality of associated devices does not exceed the constraint;
wherein the means for controlling comprises a cluster node of network elements arranged in a functional hierarchical manner comprising a top network element communicating with an associated management station to receive the power policy from the associated management station, and first and second subtending network elements communicating respectively with first and second associated power consuming client devices; and,
wherein the cluster node is operable to operate in a collaborative cluster power management mode whereby power management policies are communicated by the top network element to the first and second subtending network elements wherein the top network element and the first and second subtending network elements are configured to negotiate and collaboratively share responsibility for executing the power management policies relative to the respective first and second associated power consuming client devices.

26. The apparatus set forth in claim 25, further comprising:
means for setting a first power consumption limit to a first set of devices; and
means for setting a second power consumption limit to a second set of devices.

27. The apparatus set forth in claim 25, further comprising means for limiting an amount of power provided to the at least one power consuming device.

28. The apparatus set forth in claim 25, further comprising means for limiting the at least one power consuming device's access to an associated network responsive to determining the at least one power consuming device is exceeding the constraint.

29. The apparatus set forth in claim 28, the means for limiting further comprising means for limiting an amount of bandwidth the at least one power consuming device may use to access the associated network.

* * * * *